Oct. 25, 1932.  A. CROSSLEY  1,884,585
TEMPERATURE CONTROL SYSTEM
Filed Feb. 11, 1929  4 Sheets-Sheet 1
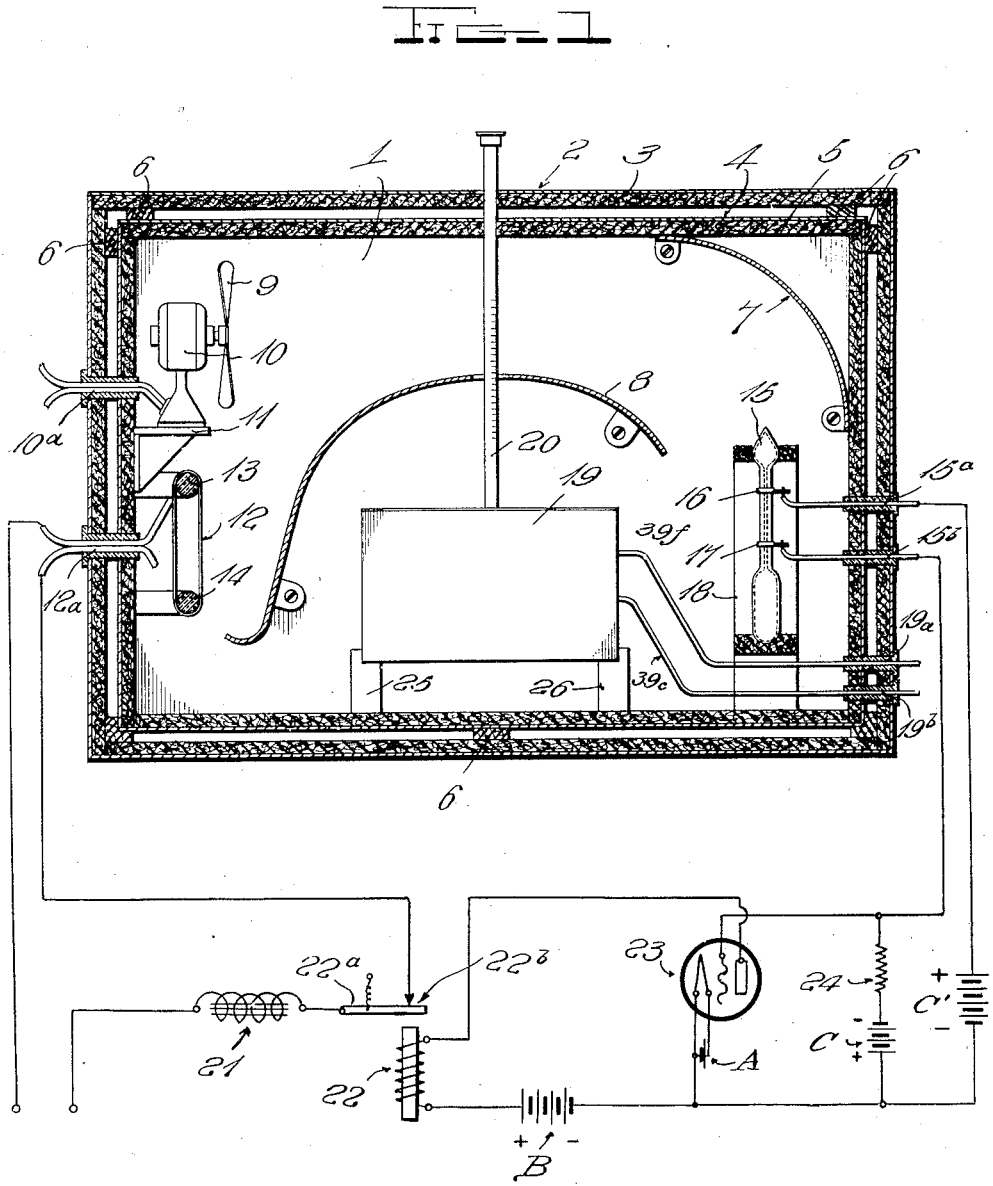
Inventor
Alfred Crossley
By Harold Dodd
Attorney

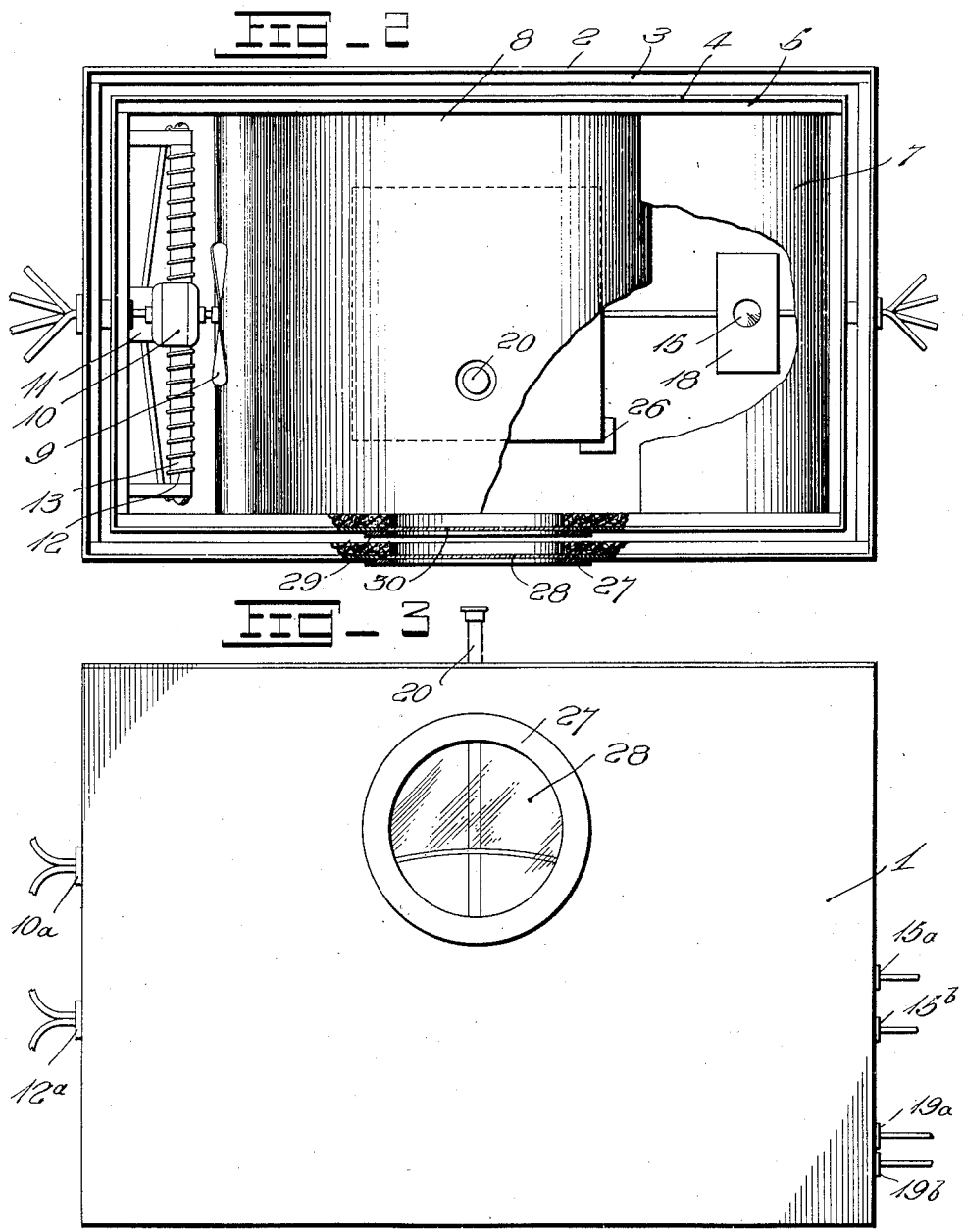

Oct. 25, 1932. A. CROSSLEY 1,884,585
TEMPERATURE CONTROL SYSTEM
Filed Feb. 11, 1929 4 Sheets-Sheet 3
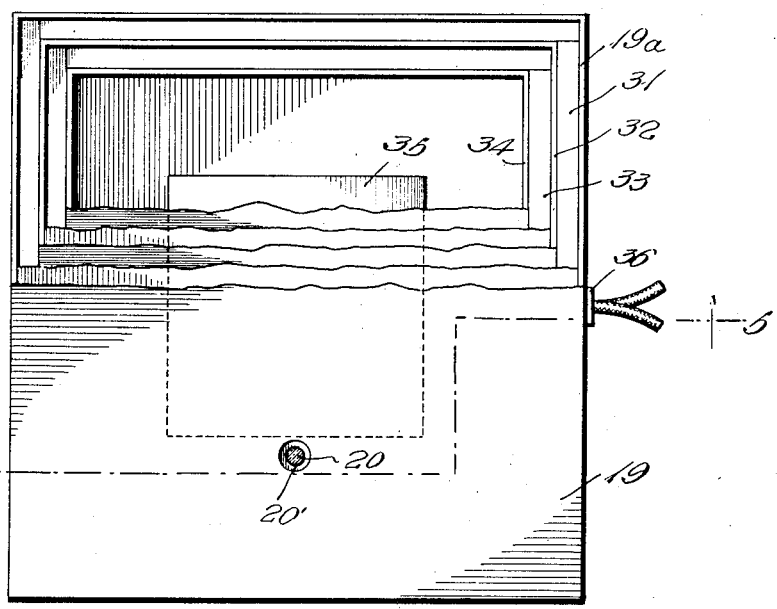
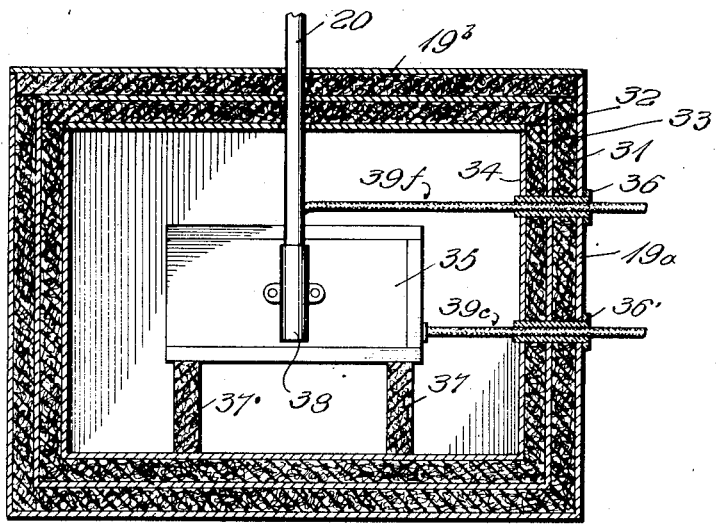
Inventor
*Alfred Crossley*
By Harold Dodd
Attorney Oct. 25, 1932.   A. CROSSLEY   1,884,585
TEMPERATURE CONTROL SYSTEM
Filed Feb. 11, 1929   4 Sheets-Sheet 4
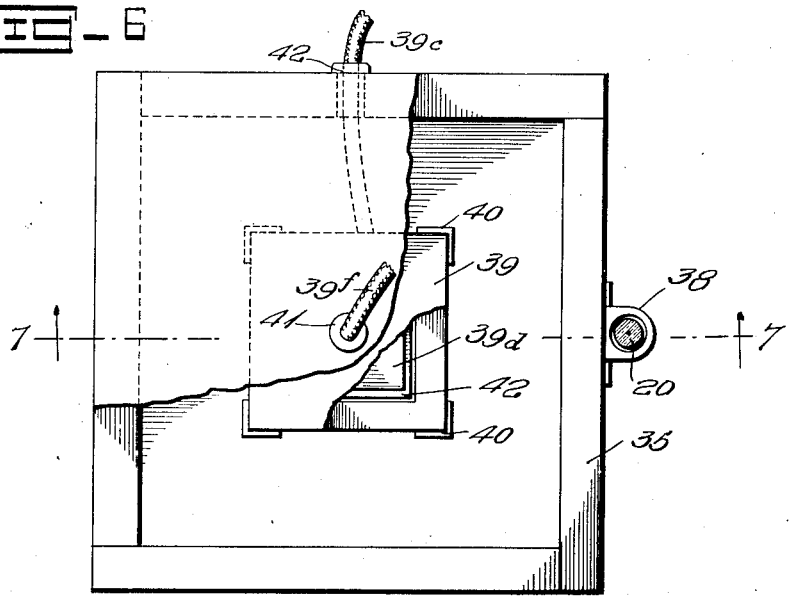
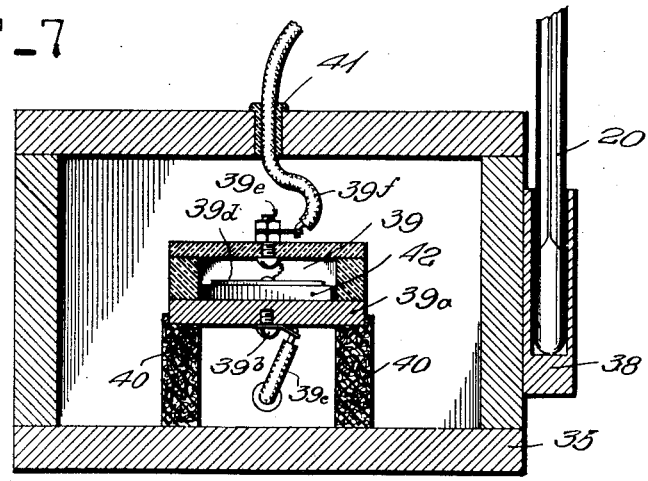
Inventor
*Alfred Crossley*
By Harold Dodd,
Attorney Patented Oct. 25, 1932

1,884,585

UNITED STATES PATENT OFFICE

ALFRED CROSSLEY, OF WASHINGTON, DISTRICT OF COLUMBIA

TEMPERATURE CONTROL SYSTEM

Application filed February 11, 1929. Serial No. 339,248.

REISSUED

My invention relates broadly to electrical temperature control systems, and more particularly a construction of cabinet in which the temperature is kept substantially uniform.

One of the objects of my invention is to provide a compartment arrangement for a cabinet structure in which the temperature may be readily controlled.

Another object of my invention is to provide a heating and gas circulating arrangement within a main compartment of a cabinet structure for maintaining the temperature within an inner compartment thereof substantially constant.

Still another object of my invention is to provide a plurality of compartments one within another in a cabinet structure and means within the outer compartment for uniformly heating and circulating the medium within it for controlling and maintaining the temperature within the inner container substantially constant.

A further object of my invention is to provide a container, the walls of which are composed of alternate layers of heat insulating and heat conducting material with a heat regulating and circulating arrangement for maintaining a compartment, the walls of which are composed of alternate layers of heat conducting and heat retaining material, positioned within the container at substantially uniform temperature.

A still further object of my invention is to provide a heat control arrangement for frequency stabilizing devices, such as electromechanical vibrators, wherein the temperature of the medium surrounding the electromechanical vibrator is maintained substantially constant by enclosing the electromechanical vibrator within a heat retaining container positioned within a substantially heat insulated container the inner medium of which is heated and temperature controlled.

According to my invention a temperature control system is provided wherein an outer container is made of a plurality of alternately positioned walls of heat conducting and heat insulating material. A smaller container, the walls of which are also preferably made of a plurality of alternately positioned walls of heat conducting and heat insulating material, is positioned within the outer container. A heat conducting medium consisting of gas or liquid is circulated all around the smaller container by mechanism, such as an electric fan. The circulating medium is heated by any suitable heater, such as an electric heating unit which is preferably positioned inside of the outer container adjacent to the fan. A thermostat is supported in the path of the circulating medium for causing the circuit of the heating unit to be either established or interrupted in accordance with any temperature change of the circulating medium. The temperature within the outer container may be thus controlled so that its maximum variation from the mean temperature will not exceed 0.02 degree centigrade.

The temperature within the smaller container which is positioned inside of the outer container and in which the electromechanical vibrator element is positioned may be kept from varying more than 0.01 degree centigrade from a mean temperature.

My invention will be more fully understood from the accompanying drawings in which:

Figure 1 illustrates a cross-sectional view in front elevation of the preferred embodiment of my invention; Fig. 2 illustrates a top view in fragmentary cross-section of the preferred embodiment of my invention wherein the cover is removed; Fig. 3 is a full view in front elevation of the preferred embodiment of my invention; Fig. 4 is a top view in fragmentary cross-section of the inner container showing the container within which the electromechanical vibrator is positioned; Fig. 5 is a vertical sectional view along the line 5—5 of Fig. 4; Fig. 6 is a top view in fragmentary cross-section of the container housing the electromechanical vibrator and Fig. 7 is a cross-sectional view in vertical elevation along the lines 7—7 of Fig. 6.

Referring to Fig. 1 of the drawings in detail, reference numeral 1 designates the outer container having walls 2, 3, 4 and 5. Walls 2 and 4 of heat conducting material, such as copper, are positioned against walls 3 and 5 which are of relatively poor heat conducting material, such as wood pulp composition or similar material having a cellular structure.

Spacers 6 are inserted between the walls 3 and 4 to maintain an air space therebetween which also serves as a heat insulating wall. Baffles 7 and 8 are provided inside of the container 1 to guide the circulating medium about the device which is subjected to constant temperature conditions within the container. A fan 9, operated by the motor 10 which is positioned upon the shelf 11 is employed to circulate the enclosed medium, which is preferably air but may be any other gas or liquid, within the container between the baffles 7 and 8. In case liquid is employed as the circulating medium within the container, an additional metallic lining (not shown) must be provided upon the inside of the container. A heating unit 12, which may consist of a winding of an electrical conductor composed of an alloy of nickel, iron and chromium, or any other alloy or metal suitable for use in electrical heaters, supported upon the rods 13 and 14 of mica or other heat resisting material, is positioned upon a wall of the container, preferably adjacent to the fan 9. A thermostat 15 comprising a column of mercury and electrodes 16 and 17 is supported by the structure 18, which is of cellular material within the container. A smaller container 19 is supported by the members 25 and 26 of pulp wood composition or similar material beneath the baffle 8. A thermometer 20 projects through an opening in container 19. Openings are also provided in the walls of the top of the container 1 through which the thermometer 20 is extended so as to facilitate the reading thereof. Bushings 10a, 12a, 15a, 15b, 19a and 19b are provided for the conductors leading to the fan motor 10, the heating unit 12, the thermostat 15 and the container 19, respectively.

Connections are provided between the circuit of the heating unit 12 and the choke coil 21 and circuit interrupting armature 22a of the relay 22. The winding of relay 22 is connected in series with the source of current supply B which is connected in the anode circuit of electron discharge device 23. Connections are also provided between the electrodes 16 and 17 of the thermostat 15 and the input circuit of the discharge device 23. The negative electrode of source of grid bias potential C is connected to the grid electrode of discharge device 23 through the high resistance unit 24. The positive electrode of source $C^1$ is connected to an electrode of the thermostat 15. The other electrode of the thermostat is connected to the grid electrode of the electron discharge device 23.

In Fig. 2 a top view of the cabinet structure wherein the top walls are removed is shown. Openings, having transparent material 28 and 30 held in position therein by rings 27 and 29, which are fastened adjacent to the openings upon the walls 2 and 4 respectively, are provided whereby the observation of the readings of the thermometer 20 is facilitated. The position of these openings is more clearly illustrated in Fig. 3 of the drawings.

A top view of the container 19 in fragmentary section is shown in Fig. 4. Walls 19a, 32 and 34 of heat conducting material, such as copper or aluminum, having positioned therebetween walls 31 and 33 of heat retaining material, such as wood pulp composition or phenol condensation products are arranged within the container 19.

A removable cover 19b composed of alternately disposed walls of heat conducting and heat retaining material is also provided for the container. An opening 20' through which the thermometer 20 projects into the container is provided in the top 19b. Bushings 36, 36' through which conductors are led into the container are positioned in openings in one of the sides. Supports 37, 37' of heat insulating material similar to that of which the walls 31 and 33 are composed, serve to support the compartment 35 as shown in Fig. 5 of the drawings. Socket member 38 for retaining the thermometer 20 directly against or adjacent the compartment 35 is supported upon one side of the compartment as shown.

In Figs. 6 and 7 the construction of the compartment 35 is shown in detail. The walls of the compartment are preferably made of conducting material, such as copper or aluminum. An electromechanical vibrator 42 of the piezo electric crystal type is positioned in the holder 39 which is supported within the compartment 35 by the members 40 of cellular material. The piezo electric element 42 rests upon the holder base 39a which is of conductive material. A screw 39b is provided in the base 39a whereby connection may be made through the conductor 39c. A contact member 39d is arranged to contact with the upper face of the piezo electric element. A binding post 39e is positioned upon the top of the holder 39. Connections between the conductor 39f, which passes to the exterior of the compartment through the bushing 41, and the plate 39d are established through the binding post 39e.

In operation the fan 9 with the assistance of the baffle plates in the box provide a continuous circulation of air through the interior of the outer container 1. The air coming in contact with the mercury thermostat 15 causes the mercury column to rise or fall according to the temperature variations of the circulating air. If the temperature is low the thermostat causes the circuit through the heating unit 12 to be closed. The heated air is then circulated over the thermostat and the mercury in the thermostat is caused to rise and close the circuit between the electrodes 16 and 17. A positive potential is impressed upon the grid electrode of the electron discharge device 23 through the action of the source of supply C'. The source of grid bias potential C which normally maintains the grid electrode of the device 23 at a negative potential with respect to the cathode is rendered ineffective when the circuit through the thermostat is established. When a positive potential is impressed upon the grid electrode of the device 23 the anode current through the relay 22 is caused to increase and the armature 22a is drawn away from the contact 22b. The circuit of the heating unit 12 is then interrupted. When the circulating air in the container 1 cools the mercury in the thermostat 15 falls and the circuit of the source C' is interrupted whereby the negative potential impressed upon the grid electrode of device 23 is again rendered effective. The anode circuit current decreases and the circuit of the heater 12 through the relay 22 is again closed. The temperature within the container 1 is thus maintained within 0.02 degree centigrade of a mean temperature.

The minute temperature variations are conducted rapidly over the entire surface of the outer copper wall of container 19. From the outer copper wall the heat is transmitted to the inner alternate walls of cellular material and copper and thence to the piezo electric element housing and holder. The walls of cellular material act to retain the heat and thus render it practically impossible to rapidly change the temperature within the piezo electric element housing from the exterior while the copper walls serve to evenly distribute the heat over the surfaces of the housing.

While I have described my invention in one of its preferred embodiments as applied to maintaining piezo electric elements at certain predetermined temperatures, I desire that it be understood that this invention may be employed in the temperature stabilization of other devices and that modifications thereof may be made without departing from the spirit and scope of this invention and that, therefore I do not desire to be limited to the precise details set forth except insofar as they are defined by the following claims.

What I claim as new and desire to secure by Letters Patent of the United States is as follows:

1. In apparatus of the class described the combination of a container, the sides of said container comprising alternate walls of heat insulating and heat conducting material, a heating unit disposed in said container, a thermostat positioned in said container, said thermostat being associated with said heating unit, a second container positioned within said first mentioned container, means for supporting said second container from the walls of said first mentioned container, means positioned within said first mentioned container for circulating the heat conducting medium therein past said heating unit, said thermostat and around said second container, a baffle positioned in the region immediately adjacent the geometrical central point of said first mentioned container for guiding the circulation of said heat conducting medium over a predetermined course, said second mentioned container being positioned beneath said baffle.

2. In apparatus of the class described the combination of a container having sides composed of alternate layers of heat conducting and heat insulating material, a heating unit disposed in said container, a thermostat positioned within said container, said thermostat being connected with said heating unit, a second container having alternate walls of heat conducting and heat retaining material positioned within said first mentioned container, members of heat insulating material supporting said second container away from said first mentioned container, a third container having walls of conducting material positioned within said second container, means positioned within said first mentioned container for circulating the heat conducting medium therein, and a baffle for guiding the circulating medium over a predetermined course.

3. In apparatus of the class described the combination of a container, a heating unit disposed in said container, a thermostat positioned in said container, members of cellular material for supporting said thermostat, relays connected with said thermostat and said heating unit whereby said thermostat controls the operation of said heating unit, a second container positioned in said first mentioned container, the walls of said second container being composed of alternate layers of heat conducting and heat retaining material, a third container located within said second conductor, the walls of said third container being of heat conductive material, and an electromechanical vibrator element holder positioned within said third container.

4. In apparatus of the class described the combination of a container, a heating unit disposed in said container, a thermostat positioned in said container, said thermostat being connected to control the operation of said heating unit, means for agitating the heat conducting medium within said container, a baffle centrally disposed in said container for guiding the circulating medium over a predetermined course within said container, a second container positioned within said first mentioned container, said second container being supported by members of cellular material away from the walls of said first mentioned container, a plurality of containers within said second container and means within said containers for supporting an electro-mechanical vibrator element.

5. In apparatus of the class described the combination of a container having alternate walls thereof composed of heat conducting and heat retaining material, a heating unit disposed in said container, a thermostat positioned within said container, relays connected with said thermostat and said heating unit whereby said thermostat operates to govern the operation of said heating unit, a second container having alternate walls of heat conducting and heat retaining material positioned within said first mentioned container, a third container positioned within said second container, means positioned upon said third container for receiving a thermometer therein, and means for circulating the heat conducting medium within said first mentioned container.

6. In apparatus of the class described the combination of a container, a heating unit disposed in said container, a thermostat positioned in said container, said thermostat being connected with said heating unit whereby the operation of said heating unit is governed by the action of said thermostat, a second container positioned in said first mentioned container, a third container positioned within said second container, and means associated with said third container for retaining a thermometer.

In testimony whereof I affix my signature.

ALFRED CROSSLEY.